United States Patent Office 3,719,596
Patented Mar. 6, 1973

3,719,596
PREPARATION OF ALKALINE-EARTH
ALKYLBENZENE SULFONATES
Samuel Shore, Roselle, and Thaddeus M. Muzyczko, Melrose Park, Ill., assignors to The Richardson Company, Des Plaines, Ill.
No Drawing. Continuation-in-part of abandoned application Ser. No. 566,758, July 21, 1966. This application Aug. 5, 1970, Ser. No. 61,418
Int. Cl. C07c 143/24; C09k 3/00
U.S. Cl. 252—1                                                    13 Claims

ABSTRACT OF THE DISCLOSURE

Method of forming neutralized homogeneous alkaline-earth alkylbenzene sulfonate double salts with low water content from suspensions of alkaline-earth hydroxides. In the method, an alkylbenzene sulfonic acid is added to form the double salt and neutralize the hydroxide. An alkanolamine is added to adjust the pH to about 7, and distillation is carried out in the presence of an alcohol to remove most of the water. Clear solutions with typically 1 percent or less by weight of water result and are obtained without additional production steps, filtration and cost problems previously associated with similar products.

CROSS-REFERENCES TO RELATED APPLICATIONS

This application is a continuation-in-part of application Ser. No. 566,758, filed July 21, 1966, now abandoned.

BACKGROUND OF THE INVENTION

This invention relates to a process for preparing liquid compositions of alkaline-earth alkylbenzene sulfonates and more particularly to a process for preparing neutral, clear, liquid compositions of not more than a very low water content.

Alkaline-earth alkylbenzene sulfonates and particularly those wherein the alkaline-earth forms a double salt such as calcium, barium, or strontium and wherein the alkyl portion is a long chain containing from 10 to 18 carbon atoms are useful as surface-active agents, corrosion inhibitors, emulsifiers, detergents, and especially lubricating oil additives for high oil systems of desirably low water content.

In many instances, it is necessary to exclude water from these systems or to reduce it to a very low value, usually below 1% by weight. Otherwise, the water can cause corrosive effects in the system or adversely affect the other properties of the product by forming haze or cloudiness in the product.

Previous procedures have not always been satisfactory for producing the desired clear, liquid compositions of sulfonates. In some instances, chemical drying has been utilized resulting not only in significant expense but also in the formation of insoluble or other deleterious contaminates from the drying agent. In other instances, the sulfonates have been prepared in an aqueous system which has necessitated the removal of large amounts of water.

One such process is described in U.S. Pat. 2,779,784 to Sharrah, whereby appreciable amounts of water and excess alkaline-earth metal hydroxides are employed to make highly basic alkaline-earth metal sulfonate salts. The process disclosed therein requires heating excess base and water in the presence of the sulfonic acid under super-atmospheric pressures. Upon completion of the reaction the highly basic dispersion is subjected to prolonged periods of distillation for water removal. More importantly, it has been discovered that the alkaline-earth sulfonate dispersions obtained by the Sharrah process are mixtures of sulfonates containing some single salt species and particularly certain basic forms, rather than a clear homogeneous composition of essentially pure double salts as obtained by the instant process. Moreover, because the prior art process requires substantially greater amounts of water, in the range of 30 to 50% to assure a stable dispersion of the salts, special high pressure apparatus is necessary to maintain this water in a liquid state when heated to temperatures of 220° F. and more.

Accordingly, it is the principal object of this invention to provide convenient means for preparing clear, non-settling liquid, essentially neutral alkaline-earth sulfonate double salt compositions of very low water content.

Another object of the present invention is to provide means for preparing alkaline-earth sulfonate salts which do not depend on high or even moderate amounts of water including excess alkaline-earth hydroxide in the process.

It is a further object to provide an improved process which avoids chemical drying and associated impurity problems as well as multi-step, prolonged periods for water removal.

A still further object is to provide convenient and inexpensive means for carrying out the process in a single reaction vessel at normal atmospheric pressure.

SUMMARY OF THE INVENTION

Briefly, the process comprises forming a fine suspension of an alkaline-earth hydroxide with a water-immiscible azeotrope-forming liquid such as toluene, xylene, tetrachloroethylene or the like in the presence of a small amount of water, adding thereto a higher-alkylbenzene sulfonic acid in a sufficient amount to form the double salt and lower the pH to an acidic range thereby neutralizing the hydroxide, adding a lower alkanolamine having from 1 to 3 hydroxy groups such as diethanolamine to neutralize the system and solubilize the salt, and finally, removing practically all water by distillation in the presence of a polyhydric alcohol.

In the process, the water-immiscible liquid also has solvent properties with respect to the sulfonate product and the alkanolamine serves as a means of stabilizing the sulfonate product without the formation of solid impurities and as solubilizing medium. The process produces a clear, liquid composition containing the sulfonate and very little, if any, water.

The alkaline-earth utilized in the process has an atomic number of 20–56 and is in Group II–A which includes calcium, barium, strontium. Calcium is a preferred alkaline-earth because of the convenience in preparing its sulfonate and the usefulness of the sulfonate product.

In the process, the suspension of the alkaline-earth hydroxide is advantageously formed by producing a slurry of it in the water-immiscible azeotrope forming liquid followed by addition of the water. It is essential that a small amount of water be present in the reaction vessel, normally in the range from about 4–10% by weight and preferably at about 5% by weight. The presence of water is believed to aid neutralization by contributing to the polarity of an otherwise highly non-polar reaction medium. It has been found that the reaction does not proceed as satisfactorily when water has been omitted, however, excessive or even moderate amounts of water in the range of from 20 to 60% are unnecessary and only add to the expense of its removal.

As previously indicated the water-immiscible liquid used in the reaction medium must be an azeotrope which is utilized during distillation for separating the liquid alkylbenzene sulfonate from the water. The most common available azetropes for use in the present invention which form non-miscible, nonsoluble binary mixtures are aliphatic and aromatic hydrocarbons such as benzene, toluene, xylene, cumene, methylnaphthalene and the like including various olefinic and halogenated hydrocarbons such as carbon tetrachloride and tetrachloroethylene. Preferable azeotropes are xylene, cumene, and toluene.

The particular higher-alkylbenzene sulfonic acid used is somewhat dependent on the utilization of the sulfonate product. Usually, the alkyl portion has about 10–18 carbon atoms and advantageously about 12–14 carbon atoms particularly when emulsifying and detergency properties are desired.

Specific examples of sulfonic acids which may be used according to the process of the present invention are decyl and dodecylbenzene sulfonic acids, tetradecylbenzene sulfonic acid, hexadecylbenzene sulfonic acid, and octadecylbenzene sulfonic acid. The higher-alkylbenzene sulfonic acid is added in sufficient amounts to neutralize the hydroxide, form the double salt, and provide a liquid system with an acidic pH. The resultant pH is usually about 4–6 and advantageously about 5. By keeping the reaction solution acidic, virtually all the alkaline-earth hydroxide is reacted which avoids turbidity and the necessity of filtration. Without an acidic pH, small amounts of calcium hydroxide, for example, will precipitate during the later removal of water which will form a hazy composition. Final products of such reaction mixtures are unstable and require filtration.

After the sulfonic acid has been added to the system, the mixture may be subjected to distillation. However, it has been found more preferable to adjust the pH to at least 7 prior to distillation by incorporating therein an alkanolamine rather than doing so after distillation has been completed. But, regardless whether the pH is raised before or after water removal, it must be adjusted to a neutral range, advantageously from 7–8 to assure solubilization of the final product. The alkanolamines found useful according to the present invention have from 1–3 hydroxy groups and may be primary, secondary or tertiary amine. Advantageously, the alkanolamine has 2-hydroxy groups and a secondary amine such as diethanolamine. Suitable alkanolamines include ethanolamine, propanolamine, butanolamine, pentanolamine, and related alkanolamines having 2–3 hydroxy groups, secondary and tertiary amino groups, and in the range of 2–10 carbon atoms. Advantageously, the alkanolamine used is one which remains in the liquid phase during the distillation step.

The resulting liquid system is then subjected to distillation so as to reduce the water content of the final product to about 1% or less. This is most readily accomplished by adding to the system a polyhydric alcohol which assures almost complete removal of water without degradation of the final product. Included within the meaning of polyhydric alcohols are those products having two or more hydroxyl groups such as diols, triols i.e. . . . ethylene glycol, propylene glycol, butylene glycol, amylene glycol, hexylene glycol, glycerol and the like. Other polyhydric alcohols found useful according to the process of the present invention are sorbitol, erythritol and pentaerythritol. Monohydric alcohols such as isopropanol and other low boiling solvents are inappropriate for use prior to and during distillation since they volatilize and result in inefficient distillation. However, monohydric alcohols can be used after distillation has been completed, when necessary to decrease the viscosity of the final product.

Although the above-mentioned polyhydric alcohols may be used during any stage of distillation it is most advantageous to add such alcohols during distillation after all the water has been removed except for about 1.5 to 2.0% by weight. During the later stages of distillation, the sulfonate double salt has a tendency to precipitate out and "bake" on the sides of the reaction vessel. By the addition of solubilizing amounts of propylene glycol practically all remaining amounts of water and azeotroping solvent are removed while product fluidity is maintained. The azeotrope removed during distillation may be either separated from the water and returned to the liquid phase or retained for future use with other batches.

The above described process can usually and advantageously be carried out in the same reaction vessel and results in a product of extremely low water content. It is not uncommon for the water content to be about 0.20% by weight or even unmeasurably low as determined by Karl Fischer water analysis. But, above all, the final products of the present invention are clear, low viscosity liquids of pure double salts of alkylbenzene sulfonates virtually free of water and basic single salt impurities. Such compositions may be readily incorporated into high oil systems.

The following example illustrates some of the embodiments of this invention. It is to be understood that these are for illustrative purposes only and do not purport to be wholly definitive as to conditions or scope.

Example

For the preparation of calcium dodecylbenzene sulfonate, a 2 liter, 4 neck, round bottom reaction flask was fitted with a thermometer, addition funnel, and water cooled condenser. Stirring was provided by a motor-driven paddle agitator. Heating was supplied by a hot oil bath.

The reaction flask was charged with approximately 65.1 g. of calcium hydroxide, 127.0 g. of methyl-naphthalene, 240.0 g. of toluene, and 39.2 g. of water. To this well agitated slurry was added 570.0 g. of dodecylbenzene sulfonic acid (equivalent weight of 326). The acid was added over a 1 hour period at a temperature range of 30° to 65° C. After the addition, the pH was approximately 5.0. Then about 16.0 g. of diethanolamine was added to change the pH to approximately 8.0.

The equipment was rearranged for distillation by adding a Barrett Trap to the condenser. Water was removed by azeotropic distillation during a 3.5 hour period at a temperature range of 100° to 126° C. When 30 g. of water had been removed, a 30.0 g. portion of propylene glycol was added to decrease the viscosity, and the azeotropic distillation was continued until no more water could be removed. At this point an additional 20.0 g. of propylene glycol was added. A total of 166.0 g. of toluene was removed by atmospheric distillation (150° C. maximum). The temperature was dropped to 120° C. and 60.0 g. of isopropanol was added.

The resultant composition was analyzed and had a water content of approximately 0.18%. The liquid was also very clear.

While the invention has been described in conjunction with a specific example thereof, this is illustrative only. Accordingly, many alternatives, modifications, and variations will be apparent to those skilled in the art in the light of the foregoing description, and it is therefore intended to embrace all such alternatives, modifications, and variations as to fall within the spirit and broad scope of the appended claims.

We claim:

1. A process for preparing clear, homogenous, liquid compositions comprising double salts of alkaline-earth alkylbenzene sulfonates having a water content of about 1% or less, the alkaline-earth portion of said salts being selected from the group consisting of calcium, barium and strontium which process comprises
   (a) charging a reaction vessel with an alkaline-earth hydroxide and a water-immicible azeotrope forming liquid to form a slurry, wherein the azeotrope forming liquid is a material selected from the group consisting of benzene, toluene, cumene, xylene, methylnaphthalene, carbon tetrachloride, and tetrachloroethylene, (b) adding thereto a small amount of water below about 20 weight percent to aid in neutralizing the alkaline-earth hydroxide, (c) reacting said mixture with a higher-alkylbenzene sulfonic acid having an alkyl group of from 10–18 carbon atoms in an amount sufficient to form the double salt and lower the reaction mixture to an acid pH, (d) adjusting the pH to about a neutral range by adding to the reaction mixture a neutralizing amount of an alkanolamine, which pH is adjusted either prior or subsequent to the following distillation, (e) and removing most of the water by distillation which distillation is completed in the presence of a polyhydric alcohol.

2. The process of claim 1 wherein the alkaline-earth hydroxide is calcium hydroxide.

3. The process of claim 1 wherein the alkaline-earth hydroxide is barium hydroxide.

4. The process of claim 1 wherein the alkaline-earth hydroxide is strontium hydroxide.

5. The process of claim 1 wherein the azeotrope forming liquid is a mixture of methylnaphthalene and toluene.

6. The process of claim 1 wherein the azeotrope forming liquid is cumene.

7. The process of claim 1 wherein the pH of the alkaline-earth alkylbenzene sulfonate is adjusted to the neutral range after distillation.

8. The process of claim 1 wherein the higher-alkylbenzene sulfonic acid is added in an amount to lower the pH to a range of form 4–6.

9. The process of claim 8 wherein the alkanolamine is added in an amount sufficient to raise the pH to a range of from 7 to 8.

10. The process of claim 9 wherein the polyhydric alcohol is propylene glycol.

11. The process of claim 10 wherein the alkaline-earth hydroxide is calcium hydroxide and the higher-alkylbenzene sulfonic acid is dodecylbenzene sulfonic acid.

12. The process of claim 1 wherein the water added to aid the neutralization of the alkaline-earth hydroxide is below about 10 weight percent.

13. The process of claim 1 wherein the pH is adjusted to about a neutral range prior to distillation.

References Cited

UNITED STATES PATENTS

| | | | |
|---|---|---|---|
| 2,865,956 | 12/1958 | Ellis et al. | 260—504 |
| 3,046,224 | 7/1962 | Andress | 252—33 |
| 1,974,069 | 9/1934 | Greer | 202—56 |
| 3,223,734 | 12/1965 | Fallstad et al. | 260—583 |
| 2,316,719 | 4/1948 | Russell | 260—400 |

GEORGE F. LESMES, Primary Examiner

W. R. DIXON, Jr., Assistant Examiner

U.S. Cl. X.R.

252—363.5, 558; 260—505 N, 505 P